(12) United States Patent
Muramatsu (10) Patent No.: US 9,004,786 B2
(45) Date of Patent: Apr. 14, 2015

(54) LIGHT QUANTITY ADJUSTING DEVICE AND IMAGING APPARATUS

(71) Applicant: JVC Kenwood Corporation, Yokohama-shi (JP)

(72) Inventor: Hideaki Muramatsu, Yokohama (JP)

(73) Assignee: JVC Kenwood Corporation, Yokohama-shi (JP)

( * ) Notice: Subject to any disclaimer, the term of this patent is extended or adjusted under 35 U.S.C. 154(b) by 0 days.

(21) Appl. No.: 14/199,803

(22) Filed: Mar. 6, 2014

(65) Prior Publication Data
US 2014/0255019 A1    Sep. 11, 2014

(30) Foreign Application Priority Data
Mar. 8, 2013 (JP) .................................. 2013-046820

(51) Int. Cl.
*G03B 9/02* (2006.01)

(52) U.S. Cl.
CPC ........................................ *G03B 9/02* (2013.01)

(58) Field of Classification Search
USPC .................. 396/449–451, 483, 484, 505, 508
See application file for complete search history.

(56) References Cited

U.S. PATENT DOCUMENTS

| 6,161,966 A * | 12/2000 | Chang et al. ................... 396/508 |
| 6,657,670 B1 * | 12/2003 | Cheng ............................ 348/363 |
| 2012/0288271 A1 * | 11/2012 | Muramatsu et al. .......... 396/505 |
| 2012/0321291 A1 * | 12/2012 | Eromaki ........................ 396/449 |

FOREIGN PATENT DOCUMENTS

| JP | 2009-115831 A | 5/2009 |
| JP | 2011-090028 A | 5/2011 |

* cited by examiner

*Primary Examiner* — W B Perkey
(74) *Attorney, Agent, or Firm* — Venable LLP; Michael A. Sartori; F. Brock Riggs (57) ABSTRACT

Provided is a light quantity adjusting device that adjusts size of a diaphragm opening centering on an optical axis of an optical system that includes: a first pair of a first and a second rectilinear diaphragm blades slidably arranged at positions opposing across the diaphragm opening in a direction moving to and from the optical axis on a plane orthogonal to the optical axis; a second pair of a third and a fourth rectilinear diaphragm blades slidably arranged at positions opposing across the diaphragm opening, in a direction orthogonal the first pair of blades move, and in a direction to and from the optical axis; and a driving unit that adjusts a size of the diaphragm opening by sliding the blades. The driving unit drives the blades so as to adjustably form and maintain a shape of an opening perimeter of the diaphragm opening in nearly similar shapes.

9 Claims, 9 Drawing Sheets

LIGHT QUANTITY ADJUSTING DEVICE AND IMAGING APPARATUS

CROSS-REFERENCE TO RELATED APPLICATIONS

The present application claims priority to and incorporates by reference the entire contents of Japanese Patent Application No. 2013-046820 filed in Japan on Mar. 8, 2013.

BACKGROUND OF THE INVENTION

1. Field of the Invention

The present invention relates to a light quantity adjusting device and an imaging apparatus, and in particular, relates to a light quantity adjusting device that is installed in a video camera and has favorable quality in a blur effect and a ghost shape, and an imaging apparatus using the same.

2. Description of the Related Art

A diaphragm device used as a light quantity adjusting device of an imaging apparatus is generally formed of diaphragm blades. It is known that its opening shape closer to a circle makes more beautiful soft focus effect and what is called a blur effect in a portrait and improves imaging quality. It is also known that because a ghost shape that occurs in a situation against the light is similar to the opening shape formed by the diaphragm blades, the ghost shape improves in quality with the opening shape closer to a circle. Thus, it is always desired that the opening shape formed by the diaphragm blades be closer to a circle as much as possible, thereby improving quality in the blur effect and the ghost shape.

In response thereto, many diaphragm devices installed in imaging lenses for use in high-performance cameras such as single-lens reflex cameras have what is called an iris diaphragm structure that arranges six or eight diaphragm blades circumferentially centering on an optical axis and drives the diaphragm blades so as to move closer to and separate from the optical axis within a plane orthogonal to the optical axis. This structure makes the opening shape formed by the diaphragm blades a hexagon or an octagon, respectively, which are closer to a circle, thereby improving quality in the blur effect and the ghost shape.

It is difficult for small-sized digital still cameras or video cameras mainly for taking moving images to adopt the iris diaphragm structure described above that arranges a plurality of diaphragm blades circumferentially centering on an optical axis and drives the diaphragm blades so as to move closer to and separate from the optical axis within a plane orthogonal to the optical axis, in order to achieve miniaturization, slimming down, and weight reduction.

In view of this, disclosed is a light quantity adjusting device that includes a pair of rectilinear diaphragm blades and a pair of swing diaphragm blades. The device slides the rectilinear diaphragm blades and swings the swing diaphragm blades to adjust the size of a diaphragm opening, thereby making the shape of the formed diaphragm opening nearly a circle or nearly a regular hexagon and reducing space around the diaphragm opening, regardless of the size of the diaphragm opening (see Japanese Patent Application Laid-open No. 2009-115831).

In contrast to the iris diaphragm structure, some light quantity adjusting devices of digital still cameras and video cameras adopt a structure that slides two diaphragm blades along a line orthogonal to an optical axis across a diaphragm opening. This structure is advantageous in achieving miniaturization; because there is no need of large space on both sides of the diaphragm blades (see Japanese Patent Application Laid-open No. 2011-090028).

The Japanese Patent Application Laid-open No. 2009-115831 discloses rectilinear diaphragm blades, swing diaphragm blades, and further a base member including a driving unit for the swing diaphragm blades so as to have a high parts count and to become complicated structure. As a result, although the structure is simplified on the plane parallel to the diaphragm blades, it is difficult to miniaturize the entire imaging apparatus; and there is a problem in restrictions to the shape of a casing.

Although Japanese Patent Application Laid-open No. 2011-090028 discloses no need of large space on both sides of the diaphragm blades but the simple diaphragm blade structure; it must have a linear blade driving lever, similarly making it difficult to miniaturize the entire imaging apparatus, and there is a problem in restrictions to the shape of a casing.

SUMMARY OF THE INVENTION

There is a need to at least partially solve the problems in the conventional technology.

According to an embodiment, provided is a light quantity adjusting device that adjusts size of a diaphragm opening centering on an optical axis of an optical system. The light quantity adjusting device includes: a first pair of rectilinear diaphragm blades configured to include a first rectilinear diaphragm blade and a second rectilinear diaphragm blade that are slidably arranged at positions opposing across the diaphragm opening in a direction moving closer to and separating from the optical axis on a plane orthogonal to the optical axis; a second pair of rectilinear diaphragm blades configured to include a third rectilinear diaphragm blade and a fourth rectilinear diaphragm blade that are slidably, centering on an axis parallel to the optical axis, arranged at positions opposing across the diaphragm opening in a direction orthogonal to a direction in which the first pair of rectilinear diaphragm blades move and in a direction moving closer to and separating from the optical axis; and a driving unit configured to adjust a size of the diaphragm opening by sliding the first, the second, the third, and the fourth rectilinear diaphragm blades as the two pairs of rectilinear diaphragm blades. The driving unit drives the first, the second, the third, and the fourth rectilinear diaphragm blades so as to adjustably form and maintain a shape of an opening perimeter of the diaphragm opening in nearly similar shapes.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Described below is a preferred embodiment for implementing a light quantity adjusting device and an imaging apparatus according to the present invention.

Figure 1:
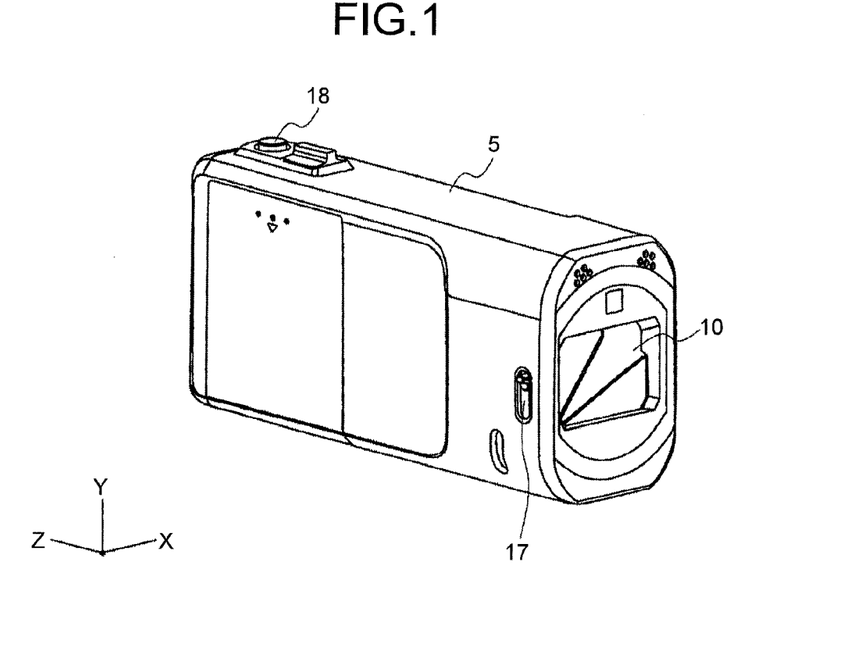
FIG. 1 is a perspective view of the structure of an imaging apparatus adopted in an embodiment of the present invention viewed from an upper side.
Figure 2:
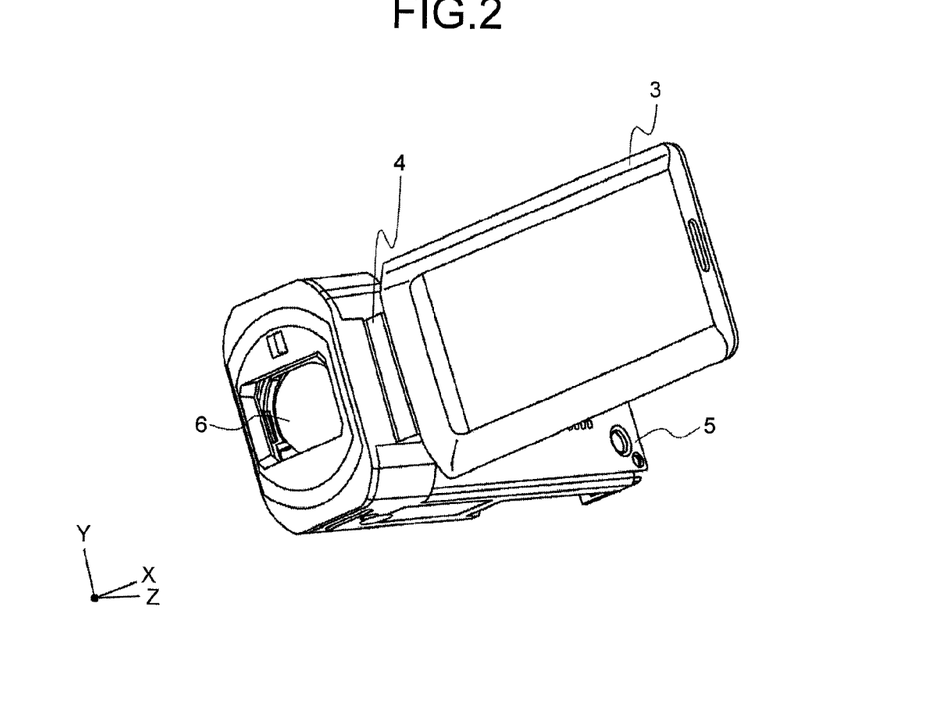
FIG. 2 is a perspective view of the imaging apparatus adopted in the embodiment viewed from a lower side on the monitor unit side.

FIG. 1 and FIG. 2 are perspective views illustrating the entire structure of an imaging apparatus 100 according to the present embodiment. FIG. 1 is a perspective view viewing the imaging apparatus 100 from the left front side, and FIG. 2 is a perspective view viewing the imaging apparatus 100 from the right front side. For the clarity of description, the following description will be given using an xyz orthogonal coordinate system as illustrated in the drawings.

The z-axis indicates the front-back direction of the imaging apparatus 100, the y-axis indicates the top-bottom direction (the vertical direction) of the imaging apparatus 100, and the x-axis indicates the right-left direction (the lateral direction) of the imaging apparatus 100. In other words, the z-direction is a direction parallel to the optical axis of a lens provided in the imaging apparatus 100, and the y-direction and the x-direction are directions perpendicular to the optical axis of the lens provided in the imaging apparatus 100. In a situation in which a user holds the imaging apparatus 100 with a lens 6 pointing to a photogenic subject (an object), with the side opposite the lens 6 pointing to the user, and with an operating unit 18 pointing upward; directions are determined with respect to the user holding the imaging apparatus 100. In other words, it is determined that the positive x-axial side is the left side, the negative x-axial side is the right side, the positive y-axial side is the top side, the negative y-axial side is the bottom side, the positive z-axial side is the back side (the rear face side), and the negative z-axial side is the front side (a front face side). The above directions are relatively determined, which may change in accordance with the orientation of the imaging apparatus 100.

As illustrated in FIG. 1 and FIG. 2, the imaging apparatus 100 includes a body part 5, a monitor unit 3, the lens 6, a lens barrier 10, and the operating unit 18. The imaging apparatus 100 includes a camera shake compensation mechanism.

The body part 5 has nearly a rectangular parallelepipedal shape and incorporates a lens tube including the lens 6, the camera shake compensation mechanism including an imaging element, a control circuit, a memory, and the like. The lens barrier 10 covering the lens 6 is arranged on the front face of the body part 5. The lens barrier 10 opens to expose the lens 6, thereby making the lens ready for imaging. Arranged on the front face of the right side of the body part 5 is a lever 17 for switching between the opening and closing of the lens barrier 10. Arranged on the top face of the body part 5 is the operating unit 18 having operating buttons and the like. The operating unit 18 includes a recording start button, a recording end button, and the like. A user operates the operating unit 18 to image a subject.

As illustrated in FIG. 2, the monitor unit 3 is arranged on the left side of the body part 5. The monitor unit 3 is connected to the body part 5 through a hinge 4. The hinge 4 attaches the monitor unit 3 to the body part 5 in an openable manner. The monitor unit 3 includes a liquid crystal display that displays a subject, stored image data, setting information, and other pieces of information. When the monitor unit 3 is open, a monitor of the monitor unit 3 is arranged backward, that is, toward the user. When a touch panel function is included, a display of the monitor unit 3 serves as part of an operating unit.

The lens 6 guides external light to the imaging element within the imaging apparatus 100 and has a diaphragm device as a light quantity adjusting device. The body part 5 arranges the imaging element, the control circuit, and the like. The imaging apparatus 100 receives light propagating through the lens 6 to image a subject. A battery is housed in the right side of the body part 5 opposite the left side in which the monitor unit 3 is arranged. The battery is attached in a detachable manner to the body part 5 and supplies power to the monitor unit 3 and the imaging element of the imaging apparatus 100.

Figure 3A:
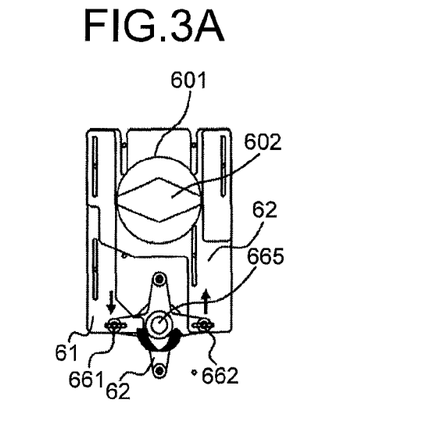
FIGS. 3A to 3C are conceptual diagrams illustrating the movement of a light quantity adjusting device adopted in the embodiment.
Figure 3B:
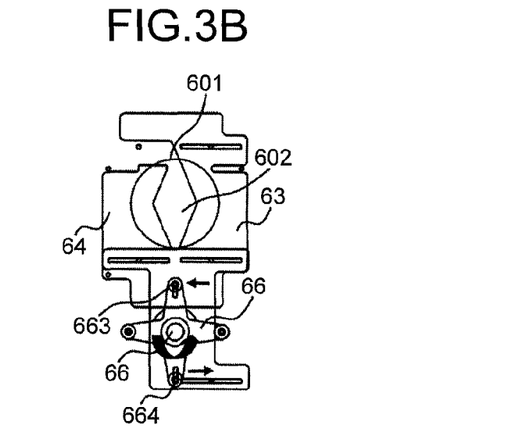
Figure 3C:
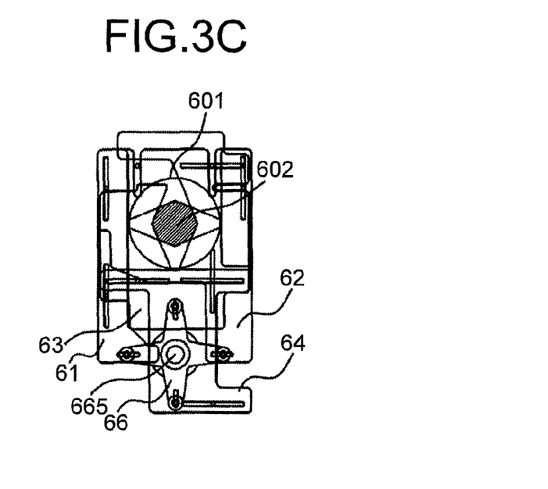

Described below in detail is a diaphragm device 600 arranged for the lens 6. FIGS. 3A to 3C are conceptual diagrams illustrating the movement of the diaphragm device 600. The light quantity of an opening 601 of the lens 6 is adjusted to form a nearly regular octagonal opening shape 602. For description, parts other than a principal part are not illustrated, and description will be given for each pair of diaphragm blades.

Described first with reference to FIG. 3A is a pair of rectilinear diaphragm blades that rectilinearly move in the y-axial direction of the imaging apparatus 100. Rectilinearly moving refers to sliding the diaphragm blades to move them rectilinearly in contrast to rotating or swinging, and the term is adopted in the following description. The pair includes a first rectilinear diaphragm blade 61 and a second rectilinear diaphragm blade 62 that move in conjunction with each other closer to and separate from the optical axis in the y-axial direction within a plane orthogonal to the optical axis. The first rectilinear diaphragm blade 61 and the second rectilinear diaphragm blade 62 are coupled to a driving arm 66 at positions with the same distance from a driving arm rotating shaft 665 through a first rectilinear diaphragm blade driving boss 661 and a second rectilinear diaphragm blade driving boss 662, respectively.

The driving arm 66 rotates about the driving arm rotating shaft 665. When the driving arm 66 rotates in the arrow direction of the drawing, the first rectilinear diaphragm blade driving boss 661 and the second rectilinear diaphragm blade driving boss 662 rectilinearly move in conjunction with each other in the arrow directions in the y-axial direction. This causes the first rectilinear diaphragm blade 61 and the second rectilinear diaphragm blade 62 to rectilinearly move in a direction narrowing the gap, thus adjusting the light quantity of the opening 601 of the lens 6 to form the opening shape 602.

Described next with reference to FIG. 3B is a pair of rectilinear diaphragm blades that rectilinearly move in the x-axial direction of the imaging apparatus 100. The pair includes a third rectilinear diaphragm blade 63 and a fourth rectilinear diaphragm blade 64 that move in conjunction with each other so as to move closer to and separate from the optical axis in the x-axial direction within a plane orthogonal to the optical axis. The third rectilinear diaphragm blade 63 and the fourth rectilinear diaphragm blade 64 are coupled to the driving arm 66 at positions with the same distance from the driving arm rotating shaft 665 through a third rectilinear diaphragm blade driving boss 663 and a fourth rectilinear diaphragm blade driving boss 664, respectively.

The driving arm 66 rotates about the driving arm rotating shaft 665. When the driving arm 66 rotates in the arrow direction of the drawing, the third rectilinear diaphragm blade driving boss 663 and the fourth rectilinear diaphragm blade driving boss 664 rectilinearly move in conjunction with each other in the arrow directions in the x-axial direction. This causes the third rectilinear diaphragm blade 63 and the fourth rectilinear diaphragm blade 64 to rectilinearly move in a direction narrowing the gap, thus adjusting the light quantity of the opening 601 of the lens 6 to form the opening shape 602.

As illustrated in FIG. 3C, the diaphragm device 600 includes two sets of a pair of diaphragm blades, namely, the first rectilinear diaphragm blade 61, the second rectilinear diaphragm blade 62, the third rectilinear diaphragm blade 63, and the fourth rectilinear diaphragm blade 64, which are aligned in the z-axial direction. When the driving arm 66 rotates about the driving arm rotating shaft 665, the first rectilinear diaphragm blade 61 and the second rectilinear diaphragm blade 62 move within the plane orthogonal to the optical axis closer to and separate from the y-axial direction with regard to the optical axis; while the third rectilinear diaphragm blade 63 and the fourth rectilinear diaphragm blade 64 move in conjunction with each other so as to move within the plane orthogonal to the optical axis closer to and separate from the optical axis in the x-axial direction with respect to the optical axis. At the same time, the pair of the first rectilinear diaphragm blade 61 and the second rectilinear diaphragm blade 62 and the pair of the third rectilinear diaphragm blade 63 and the fourth rectilinear diaphragm blade 64 are also driven in conjunction with each other.

Thus, when the driving arm 66 rotates about the driving arm rotating shaft 665, the first rectilinear diaphragm blade 61, the second rectilinear diaphragm blade 62, the third rectilinear diaphragm blade 63, and the fourth rectilinear diaphragm blade 64 rectilinearly move in conjunction with each other, thereby as illustrated in the drawing, adjusting the light quantity of the opening 601 of the lens 6 to form the opening shape 602 with a polygonal shape close to a circle. In this example, the apex angles of the first rectilinear diaphragm blade 61, the second rectilinear diaphragm blade 62, the third rectilinear diaphragm blade 63, and the fourth rectilinear diaphragm blade 64 are 135 degrees, thereby forming the opening shape 602 of the opening 601 of the lens 6 nearly regular octagonal similar shapes, regardless of the light quantity to be adjusted.

As described above, two sets of two rectilinear diaphragm blades, or a total of four rectilinear diaphragm blades form an opening perimeter of a lens. One set of diaphragm blades rectilinearly move in mutually opposite directions in the y-axial direction; while the other set of diaphragm blades rectilinearly move in mutually opposite directions in the x-axial direction. These are guided by bosses formed on a base described below to rectilinearly move stably.

The two sets of two, or a total of four rectilinear diaphragm blades are all coupled to the single driving arm and rectilinearly move along guide bosses formed on the base through the rotation of the driving arm. The driving arm is formed in nearly a crisscross shape. The diaphragm blades that rectilinearly move in the y-axial direction are coupled to the lateral bosses of the driving arm; while the diaphragm blades that rectilinearly move in the x-axial direction are coupled to the vertical bosses of the driving arm. These two sets of two, or a total of four rectilinear diaphragm blades are arranged being crossed perpendicularly with each other. The opening shape formed by these two sets of two, or a total of four rectilinear diaphragm blades forms a polygon close to a circle centering on the optical axis.

When the apex angles of the respective diaphragm blades are 135 degrees, the opening shapes formed by the four rectilinear diaphragm blades are nearly regular octagonal similar shapes, regardless of the light quantity to be adjusted. Because the boss positions of the driving arm have the same distance from the central axis of the rotation of the driving arm in the y-axial direction and the x-axial direction, the opening shapes formed by the blades when the driving arm rotates provide similar shapes, thus achieving an iris diaphragm.

Figure 4:
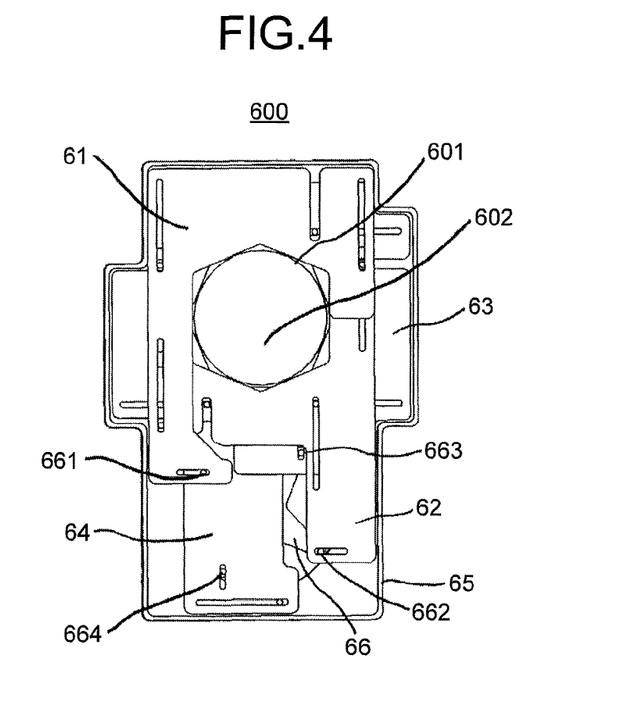
FIG. 4 is a diagram illustrating the light quantity adjusting device adopted in the embodiment.

Described next with reference to FIG. 4 is the diaphragm device 600. The diaphragm device 600 is arranged within the lens tube having the lens 6. FIG. 4 is a diagram viewing the diaphragm device 600 from a side of the lens barrier 10 in the z-axial direction.

On a base 65, from the lens barrier 10 side, the first rectilinear diaphragm blade 61, the second rectilinear diaphragm blade 62, the third rectilinear diaphragm blade 63, and the fourth rectilinear diaphragm blade 64 are engaged with the driving arm 66 at the same distance from the driving arm rotating shaft 665 (which is not illustrated in the drawing, because it is behind the fourth rectilinear diaphragm blade 64) through the first rectilinear diaphragm blade driving boss 661, the second rectilinear diaphragm blade driving boss 662, the third rectilinear diaphragm blade driving boss 663, and the fourth rectilinear diaphragm blade driving boss 664, respectively.

In the drawing, the diaphragm device 600 is in a full-open state; and the opening shape 602 is the opening 601 of the lens 6. The rotation of the driving arm 66 causes the first rectilinear diaphragm blade 61, the second rectilinear diaphragm blade 62, the third rectilinear diaphragm blade 63, and the fourth rectilinear diaphragm blade 64 to rectilinearly move along the guide bosses described below formed on the base 65. The driving arm 66 is formed in nearly a crisscross shape. The first rectilinear diaphragm blade 61 and the second rectilinear diaphragm blade 62 are each coupled in the first rectilinear diaphragm blade driving boss 661 and the second rectilinear diaphragm blade driving boss 662 which are bosses formed right side and left side of the driving arm 66, and are moved.

The third rectilinear diaphragm blade 63 and the fourth rectilinear diaphragm blade 64, which are the diaphragm blades that rectilinearly move in the x-axial direction, are each coupled to the third rectilinear diaphragm blade driving boss 663 and the fourth rectilinear diaphragm blade driving boss 664 which are the vertical bosses of the driving arm 66, and are driven. These two sets of two, or a total of four rectilinear diaphragm blades are arranged being crossed perpendicularly with each other. Thus, through the rotation of the driving arm 66, the opening shape, which is formed by the first rectilinear diaphragm blade 61, the second rectilinear diaphragm blade 62, the third rectilinear diaphragm blade 63, and the fourth rectilinear diaphragm blade 64, forms a polygon close to a circle centering on the optical axis. The order of installing these rectilinear diaphragm blades is not limited thereto, and any order may be adopted.

Figure 5:
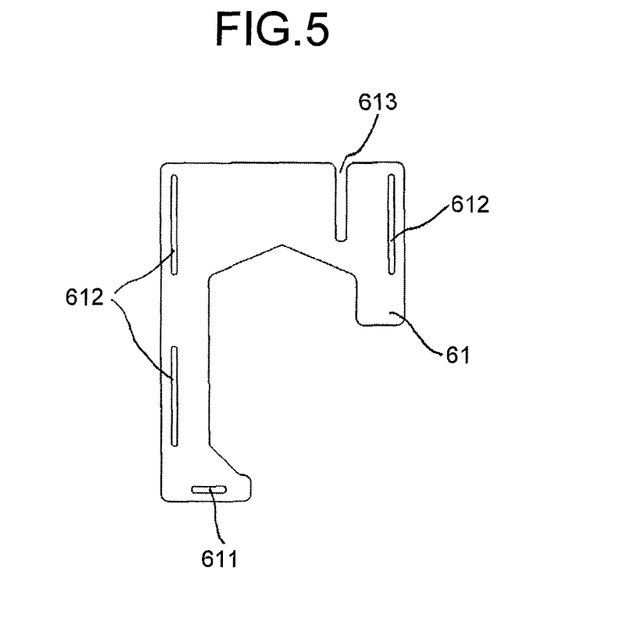
FIG. 5 is a diagram illustrating a first rectilinear diaphragm blade adopted in the embodiment.
Figure 6:
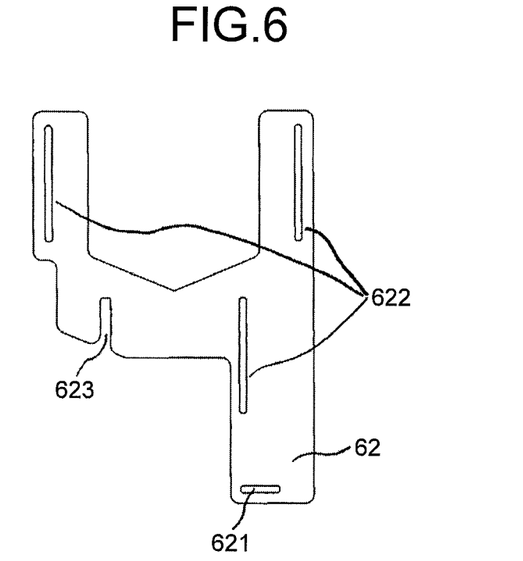
FIG. 6 is a diagram illustrating a second rectilinear diaphragm blade adopted in the embodiment.

The components of the diaphragm device 600 are described below in order. The first rectilinear diaphragm blade 61 is described with reference to FIG. 5. The first rectilinear diaphragm blade 61 is fitted to the first rectilinear diaphragm blade driving boss 661 of the driving arm 66 to be driven. The first rectilinear diaphragm blade 61 is formed with first rectilinear diaphragm blade guide holes 612, and is guided by guide bosses 652 formed on the base 65 to rectilinearly move stably. Here, numeral 613 is a bypass groove that bypasses the guide boss that guides another rectilinear diaphragm blade The second rectilinear diaphragm blade 62 is described with reference to FIG. 6. The second rectilinear diaphragm blade 62 is fitted to the second rectilinear diaphragm blade driving boss 662 of the driving arm 66 to be driven. The second rectilinear diaphragm blade 62 is provided with second rectilinear diaphragm blade guide holes 622 for moving the second rectilinear diaphragm blade 62 rectilinearly, and is guided by the guide bosses 652 formed on the base 65 to rectilinearly move stably. Here, the numeral 623 is a bypass groove that bypasses a guide boss that guides another rectilinear diaphragm.

Figure 7:
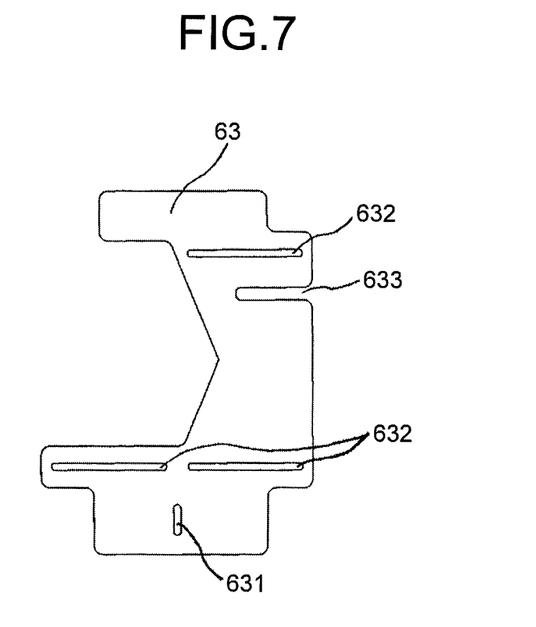
FIG. 7 is a diagram illustrating a third rectilinear diaphragm blade adopted in the embodiment.

The third rectilinear diaphragm blade 63 is described with reference to FIG. 7. The third rectilinear diaphragm blade 63 is fitted to the third rectilinear diaphragm blade driving boss 663 of the driving arm 66 to be driven. The third rectilinear diaphragm blade 63 includes third rectilinear diaphragm blade guide holes 632 for the third rectilinear diaphragm 63 to rectilinearly move, and is guided by the guide bosses 652 formed on the base 65 to rectilinearly move stably. Here, the numeral 633 is a bypass groove that bypasses a guide boss that guides another rectilinear diaphragm.

Figure 8:
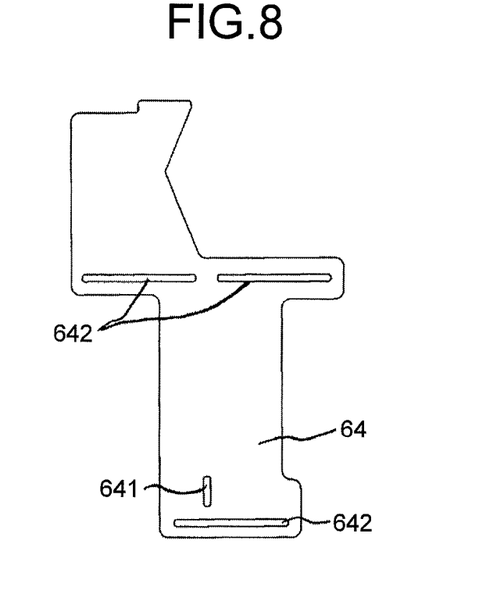
FIG. 8 is a diagram illustrating a fourth rectilinear diaphragm blade adopted in the embodiment.

The fourth rectilinear diaphragm blade 64 is described with reference to FIG. 8. The fourth rectilinear diaphragm blade 64 is fitted to the fourth rectilinear diaphragm blade driving boss 664 of the driving arm 66 to be driven. The fourth rectilinear diaphragm blade 64 includes fourth rectilinear diaphragm blade guide holes 642 for moving rectilinearly, and is guided by the guide bosses 652 formed on the base 65 to rectilinearly move stably.

Figure 9:
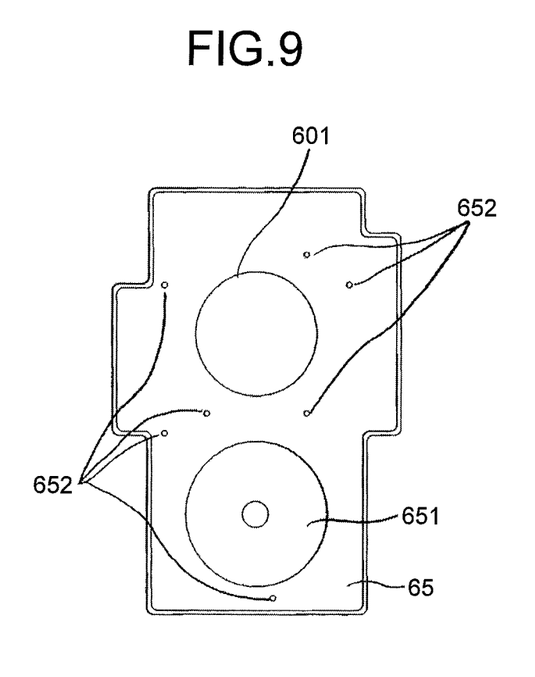
FIG. 9 is diagram illustrating a base of a diaphragm device adopted in the embodiment.

The base 65 is described with reference to FIG. 9. The base 65 is provided with the opening 601 for the lens 6, on which the first rectilinear diaphragm blade 61, the second rectilinear diaphragm blade 62, the third rectilinear diaphragm blade 63, and the fourth rectilinear diaphragm blade 64 are driven to form the opening shape 602 with a polygonal shape close to a circle so as to adjust a light quantity. For this purpose, the base 65 is provided with the guide bosses 652 corresponding to the respective rectilinear diaphragm blades. The base 65 is also provided with a driving arm housing unit 651 that is a recess for housing the driving arm 66 and is provided, on its center, with a hole for housing a mechanism that transmits power for driving the driving arm 66.

Figure 10:
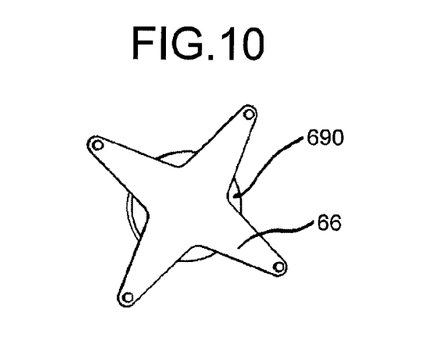
FIG. 10 is a diagram illustrating a driving arm of the diaphragm device adopted in the embodiment.

The driving arm 66 is described with reference to FIG. 10. As illustrated in the drawing, the driving arm 66 is formed in nearly a crisscross shape and has the first rectilinear diaphragm blade driving boss 661, the second rectilinear diaphragm blade driving boss 662, the third rectilinear diaphragm blade driving boss 663, and the fourth rectilinear diaphragm blade driving boss 664 corresponding to and provided on respectively the first rectilinear diaphragm blade 61, the second rectilinear diaphragm blade 62, the third rectilinear diaphragm blade 63, and the fourth rectilinear diaphragm blade 64 at the positions with the same distance from the driving arm rotating shaft 665.

The driving arm 66 has the first rectilinear diaphragm blade driving boss 661, the second rectilinear diaphragm blade driving boss 662, the third rectilinear diaphragm blade driving boss 663, and the fourth rectilinear diaphragm blade driving boss 664 corresponding to and provided on respectively the first rectilinear diaphragm blade 61, the second rectilinear diaphragm blade 62, the third rectilinear diaphragm blade 63, and the fourth rectilinear diaphragm blade 64, at the positions with the same distance from the driving arm rotating shaft 665.

As illustrated in the drawing, the driving arm 66 is formed in nearly a crisscross shape. The driving arm 66 is housed in the driving arm housing unit 651 formed in the base 65. For example, a driving motor 690 for driving the driving arm 66 is provided on the back side of the base 65 with respect to the driving arm 66 through the central hole of the driving arm housing unit 651.

Figure 11:
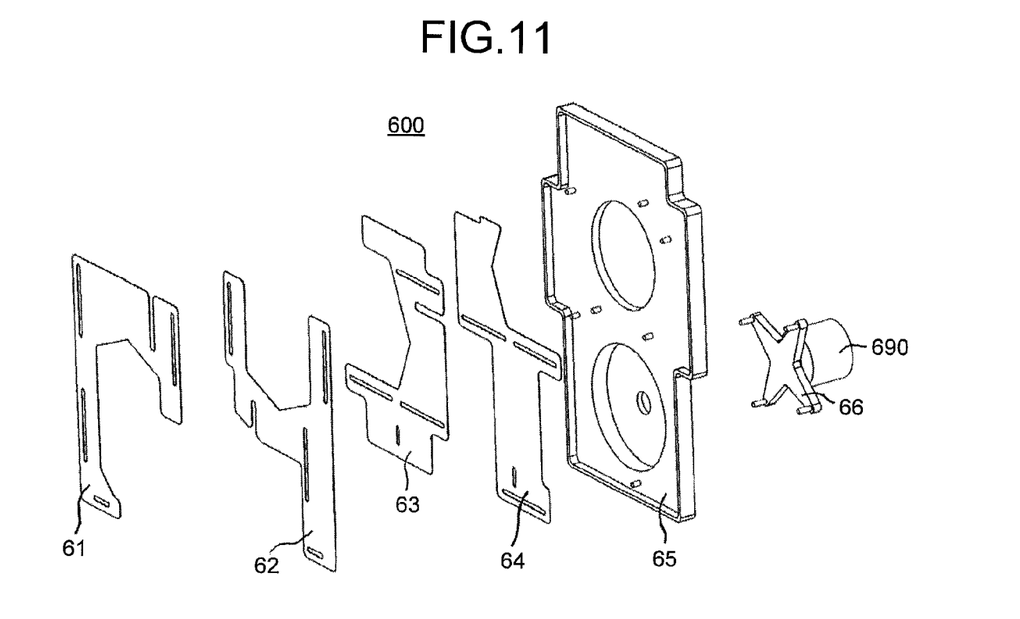
FIG. 11 is an assembly diagram of the diaphragm device adopted in the embodiment.

The assembly structure of the diaphragm device 600 is described with reference to FIG. 11. As illustrated in the drawing, arranged on the base 65 from the lens barrier 10 side are the first rectilinear diaphragm blade 61, the second rectilinear diaphragm blade 62, the third rectilinear diaphragm blade 63, and the fourth rectilinear diaphragm blade 64, which are engaged with the driving arm with the same distance from the driving arm rotating shaft 665 through the first rectilinear diaphragm blade driving boss 661, the second rectilinear diaphragm blade driving boss 662, the third rectilinear diaphragm blade driving boss 663, and the fourth rectilinear diaphragm blade driving boss 664, respectively.

The driving arm 66 is housed in the driving arm housing unit 651 formed in the base 65. The driving motor 690 for driving the driving arm 66 is provided on the back side of the base 65 with respect to the driving arm 66 through the central hole that is formed at the driving arm housing unit 651.

Figure 12A:
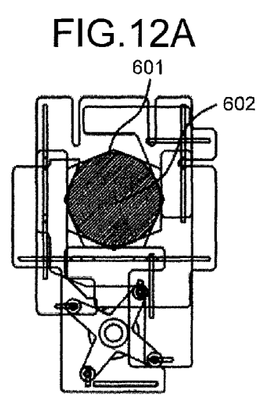
FIGS. 12A to 12F are diagrams illustrating an opening shape of the diaphragm device adopted in the embodiment.
Figure 12B:
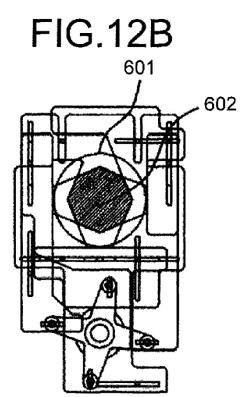
Figure 12C:
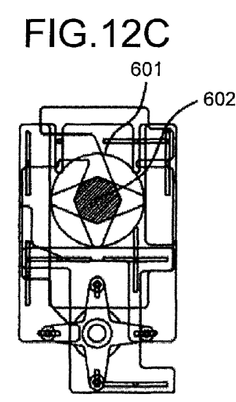
Figure 12D:
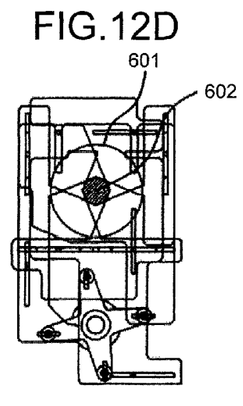
Figure 12E:
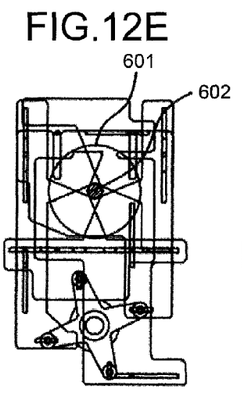
Figure 12F:
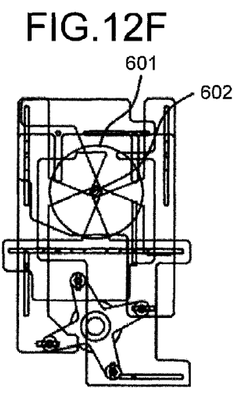
Figure 13A:
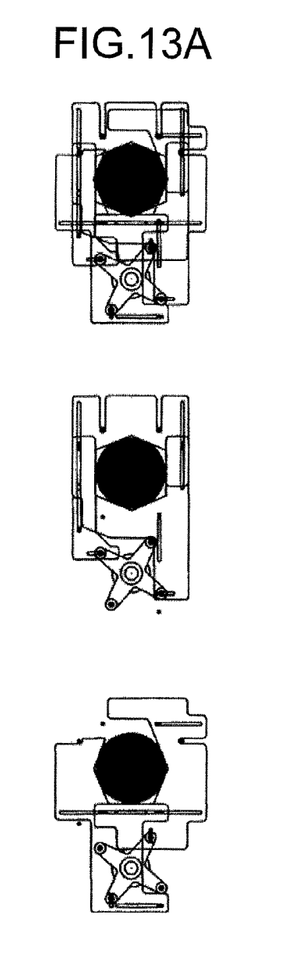
FIGS. 13A to 13F are diagrams illustrating an opening shape of the diaphragm device adopted in the embodiment.
Figure 13B:
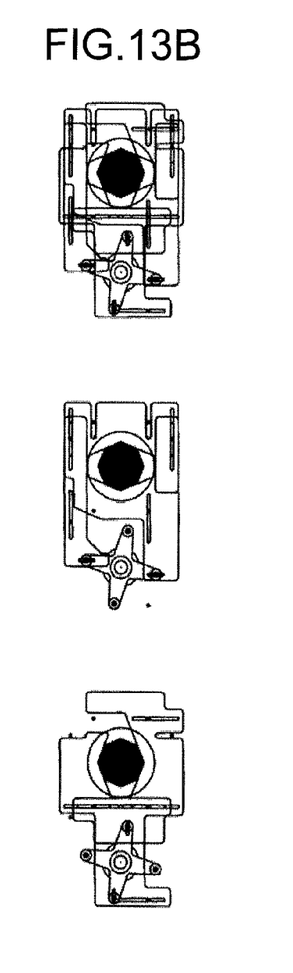
Figure 13C:
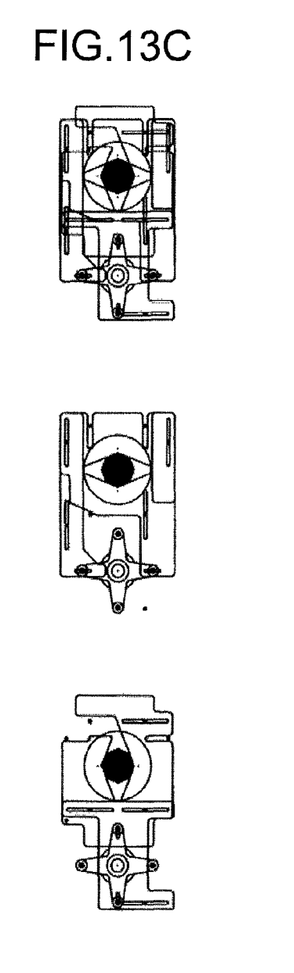
Figure 13D:
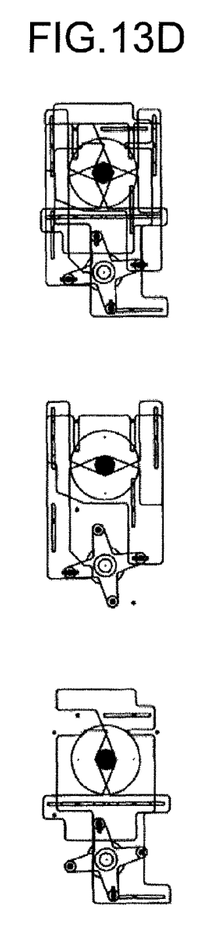
Figure 13E:
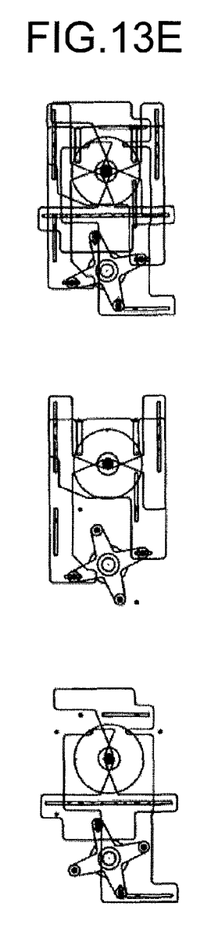
Figure 13F:
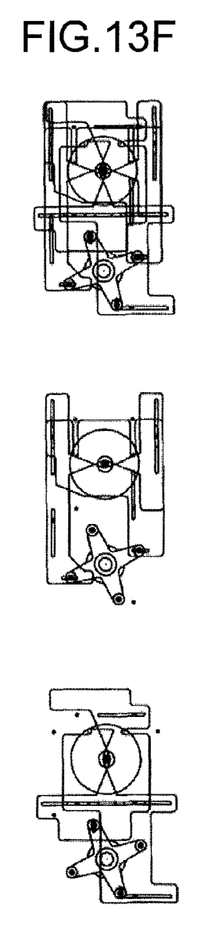

The opening shape 602 is described with reference to FIGS. 12A to 12F. FIG. 12A illustrates the opening shape 602 in a full-open state; and FIGS. 12B, 12C, 12D, 12E, and 12F illustrate in this order a process in which the first rectilinear diaphragm blade 61, the second rectilinear diaphragm blade 62, the third rectilinear diaphragm blade 63, and the fourth rectilinear diaphragm blade 64 are rectilinearly moving toward the optical axial in conjunction with each other to narrow the opening shape 602.

As seen from the drawing, the two sets of two, or a total of four rectilinear diaphragm blades, that is, the first rectilinear diaphragm blade 61, the second rectilinear diaphragm blade 62, the third rectilinear diaphragm blade 63, and the fourth rectilinear diaphragm blade 64 are all connected to the single driving arm 66 and rectilinearly move along the guide bosses 652 formed on the base 65 as the driving arm 66 rotates. The driving arm 66 is formed in nearly a crisscross shape. The diaphragm blades that rectilinearly move in the y-axial direction are connected to the lateral bosses of the driving arm 66, while the diaphragm blades that rectilinearly move in the x-axial direction are connected to the vertical bosses of the driving arm 66. These two sets of two, or a total of four rectilinear diaphragm blades are arranged being crossed perpendicularly with each other. The opening shape 602 formed by these two sets of two, or a total of four rectilinear diaphragm blades forms a polygon close to a circle centering on the optical axis.

In the present embodiment, when the apex angles of the respective diaphragm blades are 135 degrees, the opening shapes formed by the four rectilinear diaphragm blades are nearly regular octagonal similar shapes, regardless of the light quantity to be adjusted. Because the boss positions of the driving arm have the same distance from the central axis of the rotation of the driving arm in both the y-axial direction and the x-axial direction, the opening shapes, formed by the blades when the driving arm rotates, provide similar shapes as illustrated in the drawing thus realizing an iris diaphragm.

The opening shape 602 is described further with reference to FIGS. 13A to 13F. FIGS. 13A to 13F illustrate the opening shape 602 illustrated in FIGS. 12A to 12F, with the movements of the first rectilinear diaphragm blade 61 and the second rectilinear diaphragm blade 62 in the y-axial direction illustrated in the middle section of the drawings; and with the movements of the third rectilinear diaphragm blade 63 and the fourth rectilinear diaphragm blade 64 in the x-axial direction illustrated in the lower section of the drawings separately. FIGS. 13A, 13B, 13C, 13D, 13E, and 13F correspond to FIGS. 12A, 12B, 12C, 12D, 12E, and 12F, respectively.

In view of the above, as is the case with FIGS. 12A to 12F, FIG. 13A illustrates the opening shape 602 in a full-open state, and FIGS. 13B, 13C, 13D, 13E, and 13F illustrate in this order a process in which the first rectilinear diaphragm blade 61, the second rectilinear diaphragm blade 62, the third rectilinear diaphragm blade 63, and the fourth rectilinear diaphragm blade 64 are rectilinearly moving toward the optical axial in conjunction with each other to narrow the opening shape 602.

While the above embodiment has been described based on the example constituted by nearly a regular octagon each of which angle is 135 degrees, this angle is not particularly limited to 135 degrees; and even when the angles are not the same, the shape only needs to be close to a circle. Another polygon may be formed by changing the apexes of the blades.

Although each edge line forming the polygon is a straight line in the above embodiment, it may be a curved line or may be a combination of a straight line and a curved line.

As described above, the two sets of two, or a total of four diaphragm blades form the opening perimeter of the lens. One set of diaphragm blades rectilinearly move in the y-axial direction in mutually opposite directions, while the other set of diaphragm blades rectilinearly move in the x-axial direction in mutually opposite directions. Because the driving arm is formed in nearly a crisscross shape, and the respective distances thereof from the central axis of the rotation of the driving arm are the same, the opening shapes formed by the blades when the driving arm rotates provides similar shapes, thus realizing an iris diaphragm.

As described above, the diaphragm device according to the embodiment can reduce the arm length of the driving arm, and open and close the diaphragm blades with low torque. The arm length is reduced by half as compared to that of a conventional rectilinear diaphragm device. This can achieve low power consumption.

Because the driving stroke of the diaphragm blades is short, the diaphragm device can be miniaturized in the height direction. Because the movement speeds of the diaphragm blades are the same between in the top-bottom direction and in the right-left direction, the boss positions of the driving arm can also be set to be the same distance from the driving center of the driving arm, which facilitates design. Because the opening shape of the diaphragm device always keeps similar shapes until the opening is fully closed, light diffraction caused by a flat shape when the aperture is small can be minimized.

There is a need to provide a light quantity adjusting device and an imaging apparatus. The light quantity adjusting device in the embodiment includes two sets of a structure that slides two diaphragm blades along a line orthogonal to an optical axis across a diaphragm opening and drives these diaphragm blades so as to move linearly in mutually opposite directions through the rotation of a nearly crisscross-shaped driving arm, thereby eliminating the need for a large space on both sides of the diaphragm blades, miniaturizing a driving unit for the diaphragm blades, and further allowing a driving device to close the diaphragm blades with low torque and reducing the power consumption of a diaphragm device because of a shortened driving arm length.

The present invention can provide a light quantity adjusting device and an imaging apparatus that eliminates large space on both sides of diaphragm blades and can miniaturize a driving unit for the diaphragm blades.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light quantity adjusting device that adjusts a size of a diaphragm opening centered on an optical axis of an optical system, the light quantity adjusting device comprising:
   a first pair of rectilinear diaphragm blades configured to include a first rectilinear diaphragm blade and a second rectilinear diaphragm blade that are slidably arranged at positions opposing across the diaphragm opening in a direction moving closer to and separating from the optical axis on a plane orthogonal to the optical axis;
   a second pair of rectilinear diaphragm blades configured to include a third rectilinear diaphragm blade and a fourth rectilinear diaphragm blade that are centered on an axis parallel to the optical axis and are slidably arranged at positions opposing across the diaphragm opening in a direction orthogonal to a direction in which the first pair of rectilinear diaphragm blades move and in a direction moving closer to and separating from the optical axis; and
   a driving arm configured to be coupled to the first, the second, the third, and the fourth rectilinear diaphragm blades as the two pairs of rectilinear diaphragm blades and to rotate about an axis different from the optical axis and parallel to the optical axis so as to slide the first, the second, the third, and the fourth rectilinear diaphragm blades and adjust a size of the diaphragm opening;
   a driving motor configured to drive the driving arm, wherein
   a rotation of the driving arm causes the first, the second, the third, and the fourth rectilinear diaphragm blades to adjustably form and maintain, as nearly similar shapes, a shape of an opening perimeter of the diaphragm opening.

2. The light quantity adjusting device according to claim 1, wherein
   the diaphragm opening formed by the first, the second, the third, and the fourth rectilinear diaphragm blades has a polygonal shape.

3. The light quantity adjusting device according to claim 2, wherein
   the diaphragm opening with the polygonal shape has nearly an octagonal shape;
   each contour shapes of the first, the second, the third, and the fourth rectilinear diaphragm blades forms each of the apexes of the octagonal shape of the opening,
   each of the first, the second, the third, and the fourth rectilinear diaphragm blades moves from each of the apexes toward center of the optical axis, and
   each of the contour shapes forms a side of the opening.

4. An imaging apparatus comprising the light quantity adjusting device according to claim 1.

5. The light quantity adjusting device according to claim 1, wherein the driving arm comprises first, second, third, and fourth rectilinear diaphragm blade driving bosses, and the driving arm is directly attached to the first, the second, the third, and the fourth rectilinear diaphragm blades via the first, the second, the third, and the fourth rectilinear diaphragm blade driving bosses, respectively.

6. The light quantity adjusting device according to claim 1, wherein the first rectilinear diaphragm blade and the second rectilinear diaphragm blade are coupled to the driving arm at positions with a first same distance from the axis of the driving arm that is different from the optical axis and parallel to the optical axis, and wherein the third rectilinear diaphragm blade and the fourth rectilinear diaphragm blade are coupled to the driving arm at positions with a second same distance from the axis of the driving arm that is different from the optical axis and parallel to the optical axis.

7. The light quantity adjusting device according to claim 6, wherein the first same distance and the second same distance are equal.

8. The light quantity adjusting device according to claim 1, wherein the driving arm has a crisscross shape.

9. The light quantity adjusting device according to claim 1, wherein the driving arm directly contacts the first, the second, the third, and the fourth rectilinear diaphragm blades.

\* \* \* \* \*